Nov. 17, 1925.  
D. GUDEMAN  
1,562,160  
AUTOMOBILE POWER JACK  
Filed July 28, 1924
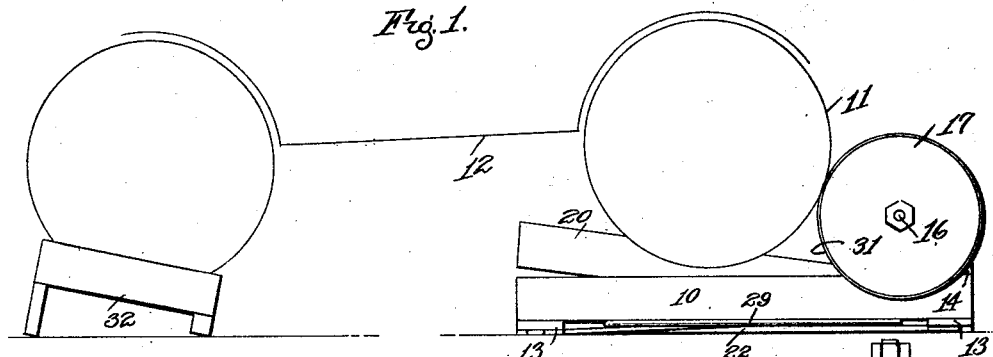
Fig. 1.
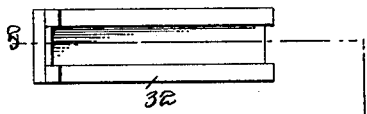
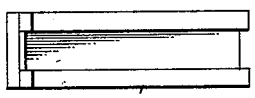
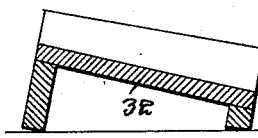
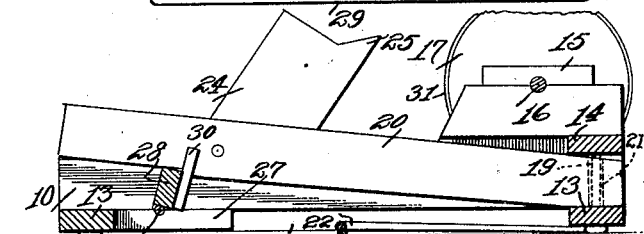
Fig. 3.
Inventor  
David Gudeman.  
By Horace C. Chandler  
Attorney Patented Nov. 17, 1925.

1,562,160

UNITED STATES PATENT OFFICE.

DAVID GUDEMAN, OF FRANCESVILLE, INDIANA.

AUTOMOBILE POWER JACK.

Application filed July 28, 1924. Serial No. 728,732.

*To all whom it may concern:*

Be it known that I, DAVID GUDEMAN, a citizen of the United States, residing at Francesville, in the county of Pulaski, State of Indiana, have invented certain new and useful Improvements in Automobile Power Jacks; and I do hereby declare the following to be a full, clear, and exact description of the invention, such as will enable others skilled in the art to which it appertains to make and use the same.

This invention relates to new and useful improvements in power devices, and particularly devices for transmission of power from automobiles to other machines which are to perform some work.

One object of the invention is to provide a simple and effective device on which an automobile may be supported, and the driving power of the rear wheels used to drive different machinery.

Another object is to provide a device of this character wherein the rear end portion of an automobile may be held in elevated position and in contact with a power shaft, so that said shaft may be driven by the wheels.

Other objects and advantages will be apparent from the following description when taken in connection with the accompanying drawing.

In the drawing:

Figure 1 is a side elevation of the automobile power jack showing an automobile thereon and in driving position.

Figure 2 is a top plan view of the same, the automobile being removed.

Figure 3 is a vertical longitudinal central sectional view on the line 3—3 of Figure 2.

Referring particularly to the accompanying drawing, 10 represents a pair of parallel tracks in which the wheels 11 of the automobile 12 are arranged to run, said tracks being connected, at their ends, by the transverse beams 13, which are arranged beneath said tracks, while a transverse beam 14 extends between the tracks, at one end, and in a plane thereabove. Carried by the inner sides of the tracks, and extending vertically therefrom, are the bearings 15, which rotatably support the end portions of the transverse shaft 16. On the ends of this shaft 16, and rotatable over the tracks, are the broad faced wheels 17, against which the rear wheels of the automobile are arranged to rest, for the purpose of rotating said shaft. On one end of the shaft, outwardly of the wheel 17, is a belt wheel 18, from which power is taken to a machine to be driven.

Disposed vertically through the beam 14, and the adjacent beam 13, at the ends of said beams, are the bolts 19, and disposed longitudinally of the inner sides of the tracks 10, and with their corresponding ends between said beams, are the lifting levers 20. The portions of the levers 20, which lie between the beams 14 and 13, are formed with elongated slots 21, through which the said bolts 19 are disposed, whereby to provide pivotal mountings for said levers. Diagonal braces 22 are secured to the frame comprised by the beams 13 and the tracks 10, to provide a rigid structure. Each of the levers 20 is formed with a vertical longitudinal slot 23, and pivotally mounted in each slot is a vertical arm 24, the upper end of which is adapted to engage beneath the rear axle housing of the automobile, for the purpose of supporting the rear end of the automobile, upon lifting the levers 20. Each of the members 24 has a vertical lug 25 at one end of its upper edge face to prevent rearward disengagement of the axle housing from said member. Extending transversely of the frame of the device, beneath the free ends of the levers 20, is a shaft 26, the end portion of which are supported in the bearings 27, secured to the lower faces of the adjacent ends of the tracks 10. Formed on the portion of this shaft 26 which lies between the inner sides of the tracks 10 is a radially extending blade 28, which, when the shaft is rocked in one direction, will engage beneath the adjacent ends of the levers 20 and raise the same, a radial lever 29 being formed on one end of the shaft, outwardly of one of the tracks, for rocking the shaft. When the shaft is rocked so that the blade lies in a horizontal plane, any further downward movement thereof is prevented by the lugs 30, which project from the outer free longer edge portion of said blade, and which lugs engage on the upper face of the adjacent beam 13. It will be noted that these lugs 30 are disposed inwardly of the levers 20, so that when said blade 28 is rocked upwardly, the lugs engage the inner sides of the levers and maintain them against lateral movement.

Around the peripheries of the wheel 17 are disposed the friction bands 31, which are preferably rubber, to prevent slipping between the treads of the tires of the rear wheels of the automobile, and the tread faces of these wheels 17, with the result that a firm positive driving engagement is maintained between the automobile driving wheels and the wheels 17, to effect the proper rotation of the shaft 16.

A pair of inclined track sections 32 are disposed at the proper distance from the front ends of the tracks 10, for supporting the front wheels of the automobile, said track sections being so disposed as to cause the automobile to throw its weight in the direction of the wheels 17, and thereby maintain firm frictional engagement between the automobile wheels and the wheels 17.

What is claimed is:

1. An automobile power jack including a base, tracks on the base, a power shaft disposed on one end of the base and having friction wheels thereon arranged above said tracks, rockable means on the base adjacent the power shaft, automobile axle engaging members movably carried by the rockable means, a rock shaft on the base beneath the rockable means and having means in lifting engagement with the rockable means, means for rocking the rock shaft, and means on the lifting means for engagement with the rockable means for preventing lateral movement of the latter.

2. An automobile power jack including a base, tracks on the base, a power shaft disposed transversely at one end of the base and having friction wheels thereon arranged over said tracks, levers movably connected to the base adjacent the power shaft and being longitudinally slotted, automobile axle engaging members movably mounted in the slots of said levers, a rock shaft mounted on the base beneath the free ends of said levers and having a terminal operating lever, means on the rock shaft for lifting engagement with said levers, and means on the last-named means for preventing lateral movement of the levers.

In testimony whereof, I affix my signature.

DAVID GUDEMAN.